United States Patent [19]

Terry et al.

[11] Patent Number: 5,295,543
[45] Date of Patent: Mar. 22, 1994

[54] CONVERTING DRILLING FLUIDS TO CEMENTITIOUS COMPOSITIONS

[75] Inventors: Dralen T. Terry, Duncan; David D. Onan, Lawton; Patty L. Totten; Bobby J. King, both of Duncan, all of Okla.

[73] Assignee: Halliburton Company, Duncan, Okla.

[21] Appl. No.: 49,056

[22] Filed: Apr. 16, 1993

Related U.S. Application Data

[63] Continuation-in-part of Ser. No. 998,279, Dec. 30, 1992.

[51] Int. Cl.5 .......................... C04B 7/12; C04B 7/28; E21B 33/14
[52] U.S. Cl. ..................... 166/293; 175/65; 106/708
[58] Field of Search ........... 166/293, 294, 292; 175/61, 65, 66; 106/679, 719, 705, 708

[56] References Cited

U.S. PATENT DOCUMENTS

| | | | |
|---|---|---|---|
| 2,109,337 | 2/1938 | Mayfield | 255/1 |
| 2,646,360 | 7/1953 | Lea | 106/90 |
| 3,557,876 | 1/1971 | Tragesser | 166/292 |
| 3,618,680 | 11/1971 | Ellard | 175/17 |
| 3,701,384 | 10/1972 | Routson et al. | 166/292 |
| 4,123,367 | 10/1978 | Dodd | 252/8.5 B |
| 4,328,036 | 5/1982 | Nelson et al. | 166/293 X |
| 4,384,896 | 5/1983 | Aitein et al. | 106/288 B |
| 4,385,935 | 5/1983 | Skjeldal | 166/292 X |
| 4,410,366 | 10/1983 | Birchall et al. | 106/90 |
| 4,775,505 | 10/1988 | Kuroda et al. | 264/82 |
| 4,781,760 | 11/1988 | Svensson et al. | 106/89 |
| 4,818,288 | 4/1989 | Aignesberger et al. | 106/90 |
| 4,933,013 | 6/1990 | Sakai et al. | 106/85 |
| 4,933,031 | 6/1990 | Blomberg et al. | 106/679 |
| 4,935,060 | 6/1990 | Dingsoyr | 106/719 |
| 5,016,711 | 5/1991 | Cowan | 166/250 |
| 5,020,598 | 6/1991 | Cowan et al. | 166/293 |
| 5,058,679 | 10/1991 | Hale et al. | 166/293 |
| 5,086,850 | 2/1992 | Harris et al. | 175/61 |

OTHER PUBLICATIONS

Malhotra et al., "Silica Fume Concrete—Properties, Applications, and Limitations", *Concrete International*, May 1983, pp. 40–46.

*Primary Examiner*—Stephen J. Novosad
*Attorney, Agent, or Firm*—Thomas R. Weaver; C. Clark Dougherty, Jr.

[57] ABSTRACT

Methods of drilling a well bore utilizing a circulating drilling fluid and subsequently disposing of the drilling fluid by converting it to a cementitious composition are provided. The methods basically comprise the steps of forming the drilling fluid with an aqueous suspension of condensed silica fume as a component thereof, drilling a well bore using the drilling fluid, activating the drilling fluid whereby it will subsequently set into a hard cementitious mass and placing the set activated drilling fluid in one or more desired locations whereby it sets therein.

20 Claims, No Drawings

CONVERTING DRILLING FLUIDS TO CEMENTITIOUS COMPOSITIONS

CROSS REFERENCE TO RELATED APPLICATIONS

This application is a continuation in part of U.S. Ser. No. 07/998,279 filed on Dec. 30, 1992.

BACKGROUND OF THE INVENTION

1. Field of the Invention

The present invention relates generally to utilizing drilling fluid in well cementing operations, and more particularly, to methods of drilling a well bore and subsequently disposing of the drilling fluid by converting it to a cementitious composition.

2. Description of the Prior Art

A variety of drilling fluids are used in drilling well bores. Generally, the drilling fluids are solids containing water base gels or hydrocarbon base fluids which can be non-weighted or weighted with particulate weighting material such as barite. After a well bore is drilled during which the drilling fluid used is circulated through the well bore, the circulation of the drilling fluid is stopped while the well is logged and a string of pipe is run in the well bore. After the pipe is run, the drilling fluid is cleaned up by circulating it downwardly through the interior of the pipe and upwardly through the annulus between the exterior of the pipe and the walls of the well bore while removing drilling solids and gas therefrom. Primary cementing operations are then performed in the well bore, i.e., the string of pipe disposed in the well bore is cemented therein by placing a cementing composition in the annulus between the pipe and the walls of the well bore. The cementing composition sets into a hard substantially impermeable mass whereby the pipe is bonded to the walls of the well bore and the annulus is sealed. When the cementing composition is run down the pipe and into the annulus, the drilling fluid in the pipe and annulus is displaced therefrom. The used drilling fluid is generally accumulated in a pit or tank and then disposed of.

The disposal of drilling fluid is time consuming and expensive, particularly in offshore drilling locations. In recent years, the expense has increased significantly in that drilling fluid often must be disposed of as a fluid which is hazardous to the environment. Thus, any environmentally safe use to which all or part of the drilling fluid can be put at a well site is highly advantageous in that it eliminates the need for subsequently disposing of all or part of the drilling fluid.

By the present invention, methods of drilling a well bore utilizing a circulating drilling fluid and subsequently disposing of the drilling fluid by converting it to a cementitious composition are provided. The converted cementitious drilling fluid composition can be used for carrying out cementing operations in the well bore, and any remaining portion thereof can be placed in an environmentally safe location wherein the drilling fluid composition sets into a hard cementitious mass.

SUMMARY OF THE INVENTION

The present invention provides methods of drilling a well bore utilizing a circulating drilling fluid and subsequently disposing of the drilling fluid by converting it to a cementitious composition which subsequently sets into a hard cementitious mass. The methods basically include the steps of forming a drilling fluid comprised of an aqueous suspension of condensed silica fume with or without other drilling fluid components, drilling a well bore using the drilling fluid, converting the drilling fluid into a cementitious composition whereby it will subsequently set into a hard cementitious mass by combining a set activator therewith and placing the set activated cementitious drilling fluid composition in at least one location whereby it sets into an environmentally safe cementitious mass therein.

The aqueous suspension of condensed silica fume is present in the drilling fluid in an amount whereby the weight ratio of the aqueous suspension of condensed silica fume to the total of other drilling fluid components therewith is in the range of from about 25:75 to about 100:0. The aqueous suspension of condensed silica fume is comprised of condensed silica fume particles having diameters less than about micrometer and water in a weight ratio of condensed silica fume to water in the range of from about 2:3 to about 3:2. The aqueous suspension also preferably includes a dispersing agent to facilitate the dispersion of the condensed silica fume particles in the water and to maintain the particles suspended therein.

A set delaying agent is also preferably combined with the set activated cementitious drilling fluid composition to increase the time in which the composition sets after the set activator is combined therewith.

It is, therefore, a general object of the present invention to provide methods of drilling a well bore utilizing a circulating drilling fluid and subsequently disposing of the drilling fluid by converting it to a cementitious composition which sets into a hard environmentally safe cementitious mass.

Other and further objects, features and advantages of the present invention will be readily apparent to those skilled in the art upon a reading of the description of preferred embodiments which follows.

DESCRIPTION OF PREFERRED EMBODIMENTS

Well bores are most commonly drilled using a rotary drill bit connected to a string of drill pipe. The drill pipe and bit are rotated and a drilling fluid, generally a water base gel or a hydrocarbon base fluid with or without weighting material suspended therein is circulated downwardly through the drill pipe, through ports in the drill bit and then upwardly through the annulus between the drill pipe and the walls of the well bore to the surface. An example of a water base gel is an aqueous solution of a clay such as bentonite containing particulate weighting material such as barite. An example of a hydrocarbon base drilling fluid is an inverted (oil external phase-water internal phase) emulsion with an oil to water ratio of from 100:to 50:50 where the water phase contains soluble salts of Na or Ca chlorides up to saturation. The hydrocarbon base drilling fluid may also contain an emulsifier, weighting material and gelling agent.

The drilling fluid carries cuttings produced by the drill bit to the surface which are separated from the drilling fluid as is any gas therein. A reservoir of circulating drilling fluid is maintained on the surface, and the drilling fluid is pumped from the reservoir by circulating pumps back into the drill string. When the well bore has reached its desired depth, the drilling and the circulation of drilling fluid are stopped, the drill pipe and bit are removed from the well bore, subterranean formations penetrated by the well bore are usually logged and pipe to be cemented in the well bore is run therein.

After the pipe to be cemented has been run in the well bore, a primary cementing operation is carried out whereby the drilling fluid in the well bore is displaced out of the well bore by a cement slurry and one or more liquid spacers which are pumped downwardly through the pipe and then upwardly into the annulus between the pipe and the walls of the well bore. The cement slurry hardens into a substantially impermeable solid mass in the annulus which bonds the pipe to the walls of the well bore and seals the annulus whereby formation fluids are prevented from flowing into the annulus between subterranean zones penetrated by the well bore and/or to the surface.

As mentioned above, the used drilling fluid which is displaced from the well bore during primary cementing must often be disposed of as a hazardous fluid under environmental protection laws. Such disposal of the drilling fluid is time consuming and expensive, particularly at offshore drilling locations where the used drilling fluid must be displaced into a tanker, transported to shore, unloaded and disposed of on shore in an environmentally safe manner.

The present invention provides methods of drilling a well bore utilizing a circulating drilling fluid and subsequently disposing of the drilling fluid by converting it into a cementitious composition which is used in cementing operations carried out in the well bore and/or otherwise placed in one or more locations wherein it sets into hard environmentally safe cementitious masses.

The methods of this invention are basically comprised of the following steps.

1. A drilling fluid is formed using an aqueous suspension of condensed silica fume as the single component thereof or as a principal component therein along with other drilling fluid components. That is, the drilling fluid can be made up of an aqueous suspension of condensed silica fume as the only component or the only component other than minor portions of additives such as fluid loss control additives, weighting materials and the like; or the aqueous suspension of condensed silica fume can be combined with other aqueous base or hydrocarbon base drilling fluid components. Thus, the weight ratio of the aqueous suspension of condensed silica fume to the total of other drilling fluid components therewith can be in the range of from about 25:75 to about 100:0. The other components of the drilling fluid can be additives such as fluid loss control agents, weighting materials and the like, or the components of water or hydrocarbon base drilling fluids so long as such components don't adversely react with the aqueous suspension of condensed silica fume component. The aqueous suspension of condensed silica fume is comprised of condensed silica fume particles having diameters less than about 1 micrometer and water in a weight ratio of condensed silica fume to water in the range of from about 2:3 to about 3:2.

2. After the drilling fluid is formed, it is used for drilling a well bore in a conventional manner.

3. Upon completion of the drilling of the well bore, the drilling fluid is converted into a cementitious composition whereby it will subsequently set into a hard cementitious mass by combining a set activator with the drilling fluid selected from the group consisting of alkaline earth metal hydroxides and oxides such as calcium hydroxide, barium hydroxide, magnesium oxide, strontium oxide and mixtures thereof.

4. The resulting set activated cementitious drilling fluid composition is placed in one or more desired locations whereby it sets into hard environmentally safe cementitious masses therein. One of the above mentioned locations can be a location in the well bore. That is, a part of the cementitious drilling fluid composition can be utilized for carrying out well bore cementing operations such as primary cementing. The remaining cementitious drilling fluid composition can be placed in other above or below ground locations and permitted to set into environmentally safe cementitious masses therein.

Condensed silica fume, also known as amorphous silica, silica dust or volitized silica is commercially available as an ultra fine powder consisting of submicron size spheres having an average diameter of about 0.1 micrometer. Condensed silica fume is a by-product material produced in the manufacture of silicon and ferrosilicon. Silicon and ferrosilicon are obtained by subjecting quartz (when silicon is produced) or quartz and an iron bearing material (when ferrosilicon is produced) to reduction with coke or coal and wood chips in an open electric arc furnace. The reduction reaction involves an intermediate reaction wherein a gaseous suboxide of silicon is formed and part of the gaseous suboxide of silicon escapes into the atmosphere. The gaseous suboxide of silicon reacts with oxygen in the atmosphere and condenses to form glassy microscopic particles known as condensed silica fume.

The condensed silica fume is recovered by filtration and is characterized by having a very fine particle size. The average size of condensed silica fume particles is about 0.1 micrometer which is about 100 times smaller than that of API Portland cement and about 10 times smaller than very fine cements such as those described in U.S. Pat. No. 4,761,183 to Clark and U.S. Pat. No. 4,160,674 to Sawyer. The specific surface area of condensed silica fume particles is about 20,000 square meters per kilogram, and the condensed silica fume generally contains more than about 90% amorphous silicon dioxide. The specific chemical composition of condensed silica fume varies in accordance with the particular silicon product produced.

The condensed silica fume can be obtained commercially in a dry powder form or in a relatively concentrated aqueous slurry form. When obtained in a slurry form, the slurry generally has a weight ratio of condensed silica fume to water in the rang of from about 2:3 to about 3:2.

In whatever form the condensed silica fume is obtained, it is combined with water r additional water to form an aqueous suspension of condensed silica fume having a weight ratio of condensed silica fume to water in the range of from about 2:3 to about 3:2. Preferably, a dispersing agent is combined with the water to facilitate the dispersal of the silica fume particles in the water and maintain the particles in suspension therein. While various dispersing agents can be used, a particularly suitable dispersing agent is comprised of the condensed polymer product of an aliphatic ketone, an aliphatic aldehyde and a compound which introduces acid groups into the condensation polymer. Such a dispersing agent is disclosed in U.S. Pat. No. 4,818,288 issued Apr. 4, 1989 to Aignesberger et al., which is incorporated herein by reference.

The most preferred dispersing agent of the type described above for use in accordance with this invention is comprised of the condensation polymer product of acetone, formaldehyde and sodium sulfite. The dispersing agent is generally included in the aqueous suspension of silica fume in an amount in the range of from about 0.1% to about 3% by weight of water in the suspension. Generally, the above described dispersing agent is commercially available in an aqueous solution containing the dispersing agent in an amount in the range of from about 30% to about 35% by weight of the solution.

As mentioned above, a drilling fluid is formed in accordance with this invention by using the above-described aqueous suspension of condensed silica fume as the drilling fluid or as a component of an aqueous or hydrocarbon base drilling fluid. The components of most commonly used water base gels and hydrocarbon base drilling fluids do not adversely react with the aqueous suspension of condensed silica fume. As also mentioned above, the aqueous suspension of condensed silica fume is included in the drilling fluid in an amount whereby the weight ratio of the aqueous suspension of condensed silica fume to the total of other drilling fluid components therein is in the range of from about 25:75 to about 100:0.

The presence of the aqueous suspension of condensed silica fume in the drilling fluid is beneficial in that it functions to lower friction pressures during drilling operations, it improves the solids carrying capability and fluid loss control properties of the drilling fluid and reduces the overall weight of the drilling fluid.

After the drilling fluid has been utilized for drilling a well bore, it can be removed from the well bore in the usual manner, taken to a location of disposal and then converted into a cementitious composition by combining a set activator selected from the group consisting of alkaline earth metal hydroxides and oxides and mixtures thereof therewith. The presence of the set activator in the drilling fluid converts the drilling fluid to a cementitious composition which subsequently sets into a hard cementitious mass. Preferably, the set activator is calcium hydroxide and is combined with the drilling fluid in an amount whereby the weight ratio of condensed silica fume in the drilling fluid to calcium hydroxide is in the range of from about 1:1.5 to about 3:1.

In a more preferred method, after pipe such as casing has been placed in the well bore, a first portion of the drilling fluid is converted into a cementitious composition by circulating it to the surface and converting it into a cementitious composition by combining a set activator therewith as described above.

The converted first portion of the drilling fluid preferably includes a set delaying additive for increasing the time in which the drilling fluid cementitious composition sets after the set activator is combined therewith. A variety of set delaying additives heretofore utilized in cement compositions can be utilized. Preferably, the set delaying additive is selected from the group consisting of a copolymer of AMPS ® (2-acrylamido-2-methyl propane sulfonic acid) and acrylic acid, tartaric acid, calcium lignosulfonate, ammonium lignosulfonate and mixtures of such additives. Most preferably, the set delaying additive is calcium lignosulfonate present in the drilling fluid composition in an amount in the range of from about 0.1% to about 2% by weight of the composition. A calcium lignosulfonate salt can be obtained commercially in an aqueous solution containing the salt in an amount in the range of from about 40% to about 60% by weight of the solution.

Once formed, the set activated cementitious first portion of the drilling fluid is pumped downwardly through the interior of the pipe disposed in the well bore and upwardly into the annulus between the pipe and the walls of the well bore whereby the remaining second portion of the drilling fluid in the well bore is displaced therefrom and the set activated first portion of the drilling fluid is placed in the annulus. The set activated first portion of the drilling fluid is permitted to set into a hard cementitious mass in the annulus.

The second portion of the drilling fluid displaced from the well bore is subsequently converted into a cementitious composition whereby it will set into a hard cementitious mass by combining a set activator therewith as described above. The second portion of the drilling fluid can be activated and utilized or disposed of at the well site, or it can be transported to a location remote from the well site, converted to a cementitious composition, and placed in an above ground or a below ground location whereby it sets into a hard environmentally safe cementitious mass therein.

The aqueous suspension of condensed silica fume is prepared by mixing the water, condensed silica fume and dispersing agent, if used. The aqueous suspension is then used directly as a drilling fluid or combined with water base or hydrocarbon base drilling fluid components in the amount described above. If desired, the aqueous suspension of condensed silica fume can be preformed by mixing the various components thereof at a location remote from the well site, or the components can be mixed at the well site just prior to use. In cementing operations carried out at offshore well locations, the non-activated drilling fluid comprised of or containing the aqueous suspension of condensed silica fume is preferably preformed on land and then delivered to the offshore location. When the location of the well site is on land, it is generally most convenient and economical to mix the components of the non-activated drilling fluid at the well site and mix the set-activator and set delaying additive, if used, with the drilling fluid just prior to utilizing the resulting cementitious drilling fluid composition in cementing operations.

When the non-activated drilling fluid is formed at the well site, it can be preformed and stored until use or the various components of the drilling fluid can be mixed on-the-fly. The set-activator and set delaying additive, if used, can also be mixed with the non-activated drilling fluid on-the-fly as the resulting set-activated cementitious drilling fluid composition is pumped into a subterranean zone to be cemented by way of the well bore penetrating the zone. The term "on-the-fly" is used herein to mean that the components are individually pumped into and are mixed as they flow through the well bore.

A preferred non-activated drilling fluid for use in accordance with this invention is comprised of water, particulate condensed silica fume consisting of particles having diameters less than about 1 micrometer and having an average particle diameter of about 0.1 micrometer suspended in the water in a weight ratio of condensed silica fume to water in the range of from about 1:2 to about 1.5:1, a dispersing agent comprised of the condensation polymer product of acetone, formaldehyde and sodium sulfite present in an amount sufficient to maintain the condensed silica fume particles in suspension, and other drilling fluid components present in an amount whereby the weight ratio of the aqueous suspension of condensed silica fume including the dispersing agent to the other drilling fluid components is in the range of from about 25:75 to about 100:0. When the drilling fluid is activated to convert it to a cementitious composition, a set activator, preferably calcium hydroxide, is combined with the drilling fluid in an amount whereby the weight ratio of condensed silica fume to calcium hydroxide is in the range of from about 1:1.5 to about 3:1. When a set delaying additive is included in the composition, preferably calcium lignosulfonate, it is added thereto, ether before or after the drilling fluid is activated, in an amount sufficient to delay the set of the composition until after it is placed in a zone to be cemented.

In the most preferred non-activated drilling fluid for use in accordance with this invention, the weight ratio of condensed silica fume to water in the aqueous suspension of condensed silica fume is about 1:1, the above described dispersing agent is present in the aqueous suspension in an amount of about 2.5% by weight of water therein and the aqueous suspension is present in the drilling fluid in an amount whereby the weight ratio of the aqueous suspension including dispersing agent to other drilling fluid components therein is in the range of from about 25:75 to about 100:0. When the drilling fluid is activated, calcium hydroxide is combined therewith in an amount whereby the weight ratio of condensed silica fume to calcium hydroxide is about 2:1. A calcium lignosulfonate set delaying agent is preferably included in the composition in an amount of about 0.3% by weight of the composition.

In performing the methods of this invention, the non-activated drilling fluid is formed and circulated in the well bore being drilled. At a proper time after drilling has been completed, the set-activator is combined with the non-activated drilling fluid and the resulting cementitious composition is placed in at least one location wherein it sets into a hard cementitious mass. Generally, a first portion of the drilling fluid is set activated and pumped into a zone in the well bore to be cemented, e.g., the annulus. As the set-activated portion of the drilling fluid is placed in the zone to be cemented, the unused portion of non-activated drilling fluid is displaced from the well bore. The unused portion of the non-activated drilling portion can be transported to a location of use or disposal, combined with the set-activator, placed in an environmentally safe location and permitted to set into a cementitious mass. As indicated above, the methods of the present invention are particularly suitable for performing primary cementing in a well bore. However, the methods can be utilized for performing other cementing procedures in the well bore such as cementing zones of lost circulation therein.

In order to further illustrate the methods of this invention, the following examples are given.

EXAMPLE 1

A cementitious composition of this invention was prepared containing the following components and amounts.

| Component | Amount, parts by weight |
|---|---|
| Silica Fume | 300 |
| Water | 400 |
| Liquid Dispersing Agent[1] | 40 |
| Liquid Set Delaying Additive[2] | 13 |
| Calcium Hydroxide Activator | 300 |
| Drilling Fluid | 263.25 |
| Total | 1316.25 |

[1] A 33% by weight aqueous solution of the condensation polymer product of acetone, formaldehyde and sodium sulfite.
[2] A 40% by weight aqueous solution of calcium lignosulfonate.
[3] 8.8 pounds/gallon fresh water mud (30 parts by weight bentonite and 350 parts fresh water).

A test sample of the above composition was tested for 72 hour compressive strength at 80° F. in accordance with the *API Specification for Materials and Testing for Well Cements*, API Specification 10A, 21st Edition dated Sep. 1, 1991, of the American Petroleum Institute, Washington, D.C. The result of the test was that the composition had a compressive strength of 1240 psi.

EXAMPLE 2

Another cementitious composition of this invention was prepared containing the following components and amounts.

| Component | Amount, parts by weight |
|---|---|
| Silica Fume | 300 |
| Water | 675 |
| Liquid Dispersing Agent[1] | 30.38 |
| Magnesium Oxide Activator | 10.13 |
| Calcium Hydroxide Activator | 150 |
| Drilling Fluid[2] | 874.13 |
| Total | 2039.64 |

[1] A 33% by weight aqueous solution of the condensation polymer product of acetone, formaldehyde and sodium sulfite.
[2] 8.8 pounds/gallon fresh water drilling mud (100 parts by weight bentonite, 116.7 parts fresh water, 13.3 parts liquid dispersant and 3.3 parts sodium hydroxide).

A test sample of the above composition was tested for 24 hour compressive strength at 100° F. The result of the test was 500 psi.

From the above examples it can be seen that the cementitious compositions of this invention have good compressive strengths and are suitable for use in well cementing operations.

The present invention is, therefore, well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of drilling a well bore utilizing a circulating drilling fluid and subsequently disposing of the drilling fluid comprising the steps of:

(a) forming said drilling fluid with an aqueous suspension of condensed silica fume in an amount whereby the weight ratio of aqueous suspension of condensed silica fume to the total of other drilling fluid components therein is in the range of from about 25:75 to about 100:0, said aqueous suspension comprising condensed silica fume particles having diameters less than about 1 micrometer and water in a weight ratio of condensed silica fume to water in the range of from about 2:3 to about 3:2;

(b) drilling said well bore using said drilling fluid;

(c) converting said drilling fluid into a cementitious composition whereby it will subsequently set into a hard cementitious mass by combining a set activator selected from the group consisting of alkaline earth metal hydroxides and oxides and mixtures thereof therewith; and (d) placing said set activated cementitious drilling fluid composition in one or more desired locations whereby it sets into hard environmentally safe cementitious masses therein.

2. The method of claim wherein said aqueous suspension of condensed silica fume further includes a dispersing agent comprised of the condensation polymer product of acetone, formaldehyde and sodium sulfite present in said suspension in an amount in the range of from about 0.1% to about 3% by weight of water in said suspension.

3. The method of claim 1 wherein said set activator is combined with said drilling fluid in accordance with step (c) in an amount whereby the weight ratio of condensed silica fume to set activator in said drilling fluid is in the range of from about 1:1.5 to about 3:1.

4. The method of claim 3 wherein said set activator is selected from the group consisting of calcium hydroxide, barium hydroxide, magnesium oxide, strontium oxide and mixtures thereof.

5. The method of claim 1 which further comprises the step of combining a set delaying additive with said set activated drilling fluid selected from the group consisting of a copolymer of AMPS® and acrylic acid, tartaric acid, calcium lignosulfonate, ammonium lignosulfonate and mixtures of said additives.

6. The method of claim 5 wherein said set delaying additive is calcium lignosulfonate and is combined with said set activated drilling fluid in an amount in the range of from about 0.1% to about 2% by weight of said drilling fluid.

7. The method of claim 1 wherein at least a portion of said set activated drilling fluid is placed in accordance with step (d) in the annulus between a pipe disposed in said well bore and the walls of said well bore.

8. A method of drilling a well bore utilizing a circulating drilling fluid and subsequently disposing of the drilling fluid comprising the steps of:

(a) forming said drilling fluid with an aqueous suspension of condensed silica fume in an amount whereby the weight ratio of aqueous suspension of condensed silica fume to the total of other drilling fluid components therein is in the range of from about 25:75 to about 100:0, said aqueous suspension comprising condensed silica fume particles having diameters less than about 1 micrometer and water in a weight ratio of condensed silica fume to water in the range of from about 2:3 to about 3:2;

(b) drilling said well bore using said drilling fluid;

(c) placing pipe in said well bore while said well bore contains said drilling fluid, said pipe being of a size such that an annular space is formed between said pipe and the walls of said well bore;

(d) converting a first portion of said drilling fluid into a cementitious composition whereby it will subsequently set into a hard cementitious mass by combining a set activator selected from the group consisting of alkaline earth metal hydroxides and oxides and mixtures thereof therewith;

(e) pumping said set activated cementitious first portion of said drilling fluid downwardly through the interior of said pipe and upwardly into said annulus between said pipe and the walls of said well bore whereby the remaining second portion of said drilling fluid in said well bore is displaced from said well bore and said set activated first portion of said drilling fluid is placed in said annulus;

(f) permitting said set activated first portion of said drilling fluid to set into a hard cementitious mass in said annulus;

(g) converting said second portion of said drilling fluid into a cementitious composition whereby it will subsequently set into a hard cementitious mass by combining a set activator selected from the group consisting of calcium hydroxide, magnesium oxide and mixtures thereof therewith; and (h) placing said set activated cementitious second portion of said drilling fluid in one or more desired locations whereby it sets into hard environmentally safe cementitious masses therein.

9. The method of claim 8 wherein said aqueous suspension of condensed silica fume further comprises a dispersing agent comprised of the condensation polymer product of acetone, formaldehyde and sodium sulfite present in said suspension in an amount in the range of from about 0.1% to about 3% by weight of water in said suspension.

10. The method of claim 8 wherein said set activator is combined with said first and second portions of said drilling fluid in accordance with steps (d) and (g), respectively, in amounts whereby the weight ratios of condensed silica fume to set activator in said first and second portions of drilling fluid are in the range of from about 1:1.5 to about 3:1.

11. The method of claim 10 wherein said set activator is calcium hydroxide.

12. The method of claim 8 wherein a set delaying additive is combined with said set activated first portion of said drilling fluid.

13. The method of claim 12 wherein said set delaying additive is selected from the group consisting of a copolymer of AMPS® and acrylic acid, tartaric acid, calcium lignosulfonate, ammonium lignosulfonate and mixtures of said additives.

14. The method of claim 13 wherein said set delaying additive is calcium lignosulfonate and is combined with said set activated drilling fluid in an amount in the range of from about 0.1% to about 2% by weight of said drilling fluid.

15. A method of drilling a well bore utilizing a circulating drilling fluid and subsequently disposing of the drilling fluid comprising the steps of:

(a) forming said drilling fluid with an aqueous suspension of condensed silica fume as a component thereof in an amount whereby the weight ratio of aqueous suspension of condensed silica fume to the total of the other components of said drilling fluid is in the range of from about 25:75 to about 100:0, said aqueous suspension including condensed silica fume particles having diameters less than about 1 micrometer, a dispersing agent comprised of the condensation polymer product of acetone, formaldehyde and sodium sulfite and water wherein the weight ratio of condensed silica fume to water is in the range of from about 2:3 to about 3:2 and said dispersing agent is present in said suspension in an amount in the range of from about 0.1% to about 3% by weight of said water therein;

(b) drilling said well bore using said drilling fluid;

(c) placing pipe in said well bore while said well bore contains said drilling fluid, said pipe being of a size such that an annular space is formed between said pipe and the walls of said well bore;

(d) combining a set delaying additive with a first portion of said drilling fluid selected from the group consisting of a copolymer of AMPS® and acrylic acid, tartaric acid, calcium lignosulfonate, ammonium lignosulfonate and mixtures of said additives;

(e) converting said first portion of said drilling fluid into a cementitious composition whereby it will subsequently set into a hard cementitious mass by combining a set activator selected from the group consisting of calcium hydroxide, barium hydroxide, magnesium oxide, strontium oxide and mixtures thereof therewith;

(f) pumping said set activated cementitious first portion of said drilling fluid downwardly through the interior of said pipe and upwardly into said annulus between said pipe and the walls of said well bore whereby the remaining second portion of said drilling fluid in said well bore is displaced from said well bore and said set activated first portion of said drilling fluid is placed in said annulus;

(g) permitting said set activated first portion of said drilling fluid to set into a hard cementitious mass in said annulus;

(h) converting said second portion of said drilling fluid into a cementitious composition whereby it will subsequently set into a hard cementitious mass by combining a set activator selected from the group consisting of calcium hydroxide, magnesium oxide and mixtures thereof therewith; and (i) placing said set activated cementitious second portion of said drilling fluid in one or more desired locations whereby it sets into hard environmentally safe cementitious masses therein.

16. The method of claim 15 wherein said set activator is combined with said first and second portions of said drilling fluid in accordance with steps (e) and (h), respectively, in amounts whereby the weight ratios of condensed silica fume to set activator in said first and second portions of drilling fluid are in the range of from about 1:1.5 to about 3:1.

17. The method of claim 16 wherein said set activator is calcium hydroxide.

18. The method of claim 15 wherein said set delaying additive is calcium lignosulfonate and is combined with said set activated drilling fluid in an amount in the range of from about 0.1% to about 2% by weight of said first portion of said drilling fluid.

19. The method of claim 15 wherein said other components of said drilling fluid comprise a water base gel.

20. The method of claim 15 wherein said other components of said drilling fluid comprise a hydrocarbon base fluid.

* * * * *